UNITED STATES PATENT OFFICE.

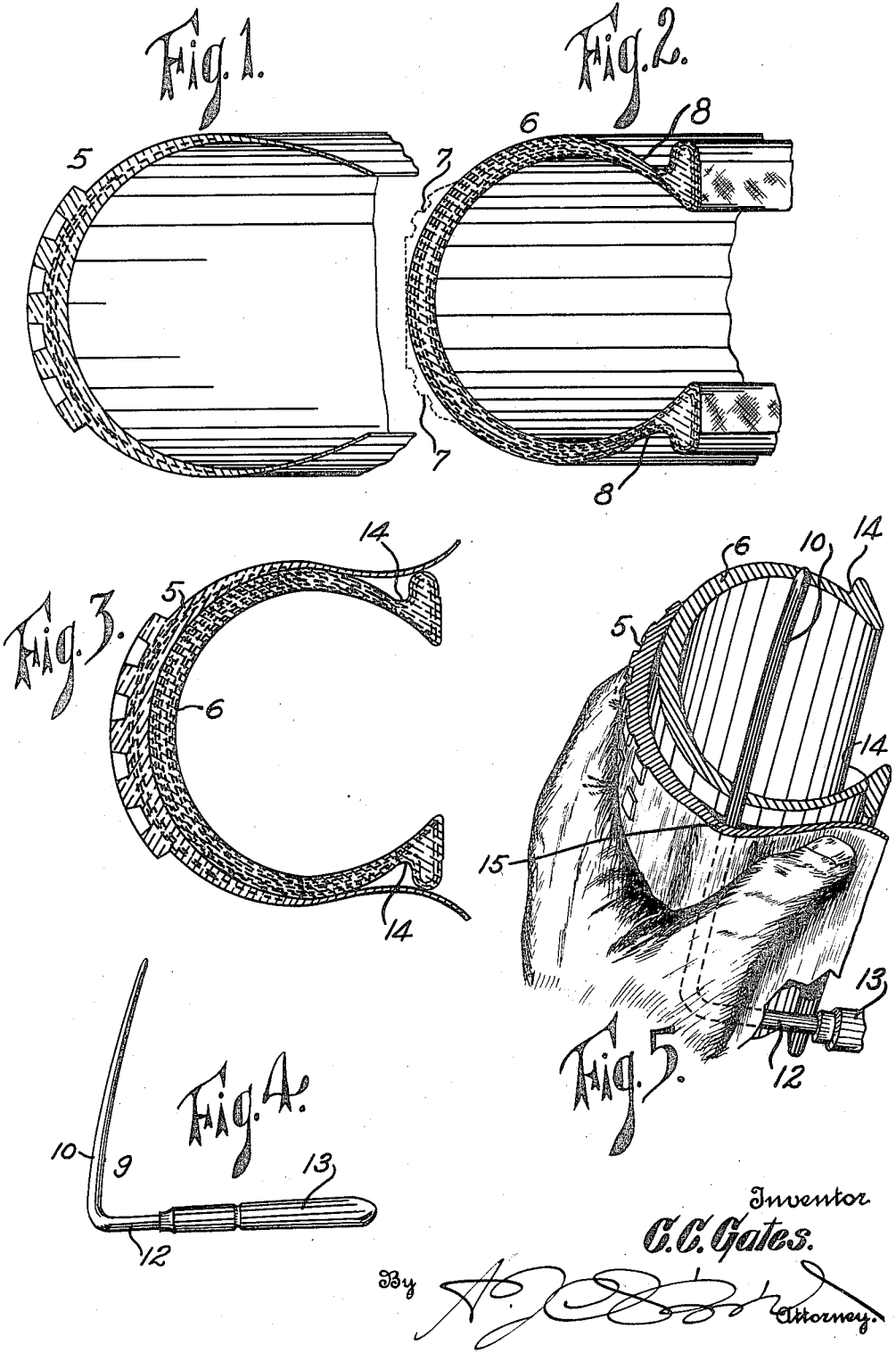

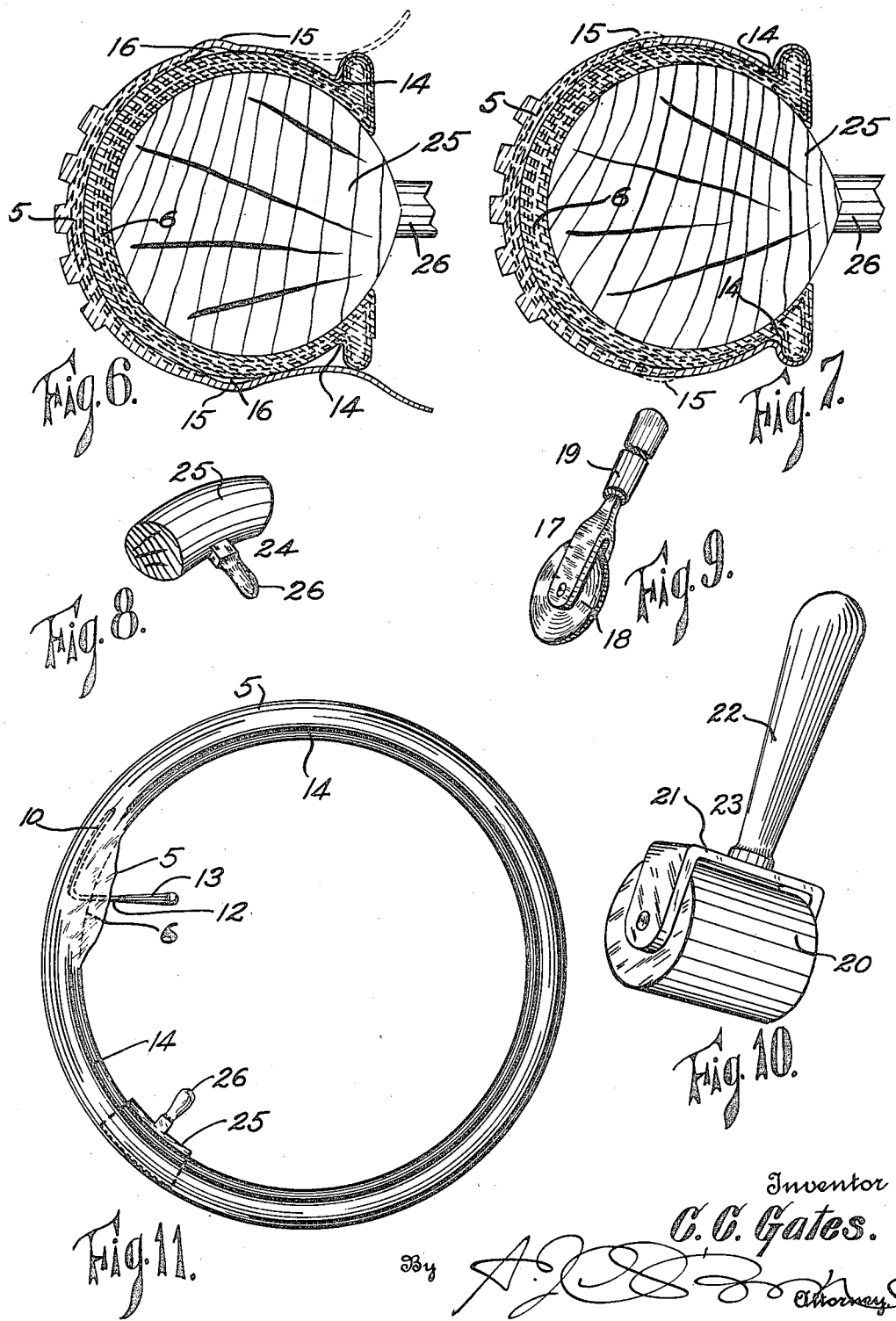

CHARLES C. GATES, OF DENVER, COLORADO.

PROCESS OF APPLYING HALF-SOLE OR REPAIR TIRES.

1,323,976.  Specification of Letters Patent.  Patented Dec. 2, 1919.

Application filed November 11, 1918. Serial No. 262,022.

*To all whom it may concern:*

Be it known that I, CHARLES C. GATES, a citizen of the United States, residing at the city and county of Denver and State of Colorado, have invented certain new and useful Improvements in Processes of Applying Half-Sole or Repair Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a method or process of applying repair tires to the carcass of an original tire after the rubber or tread portion of the latter has been so worn as to require such repair.

In my business I manufacture a repair tire, called a half-sole, which, when the tread portion of the original tire of an automobile wheel becomes sufficiently worn to need repair, is applied to the latter. In carrying out the process of applying the repair or half-sole tire to the worn carcass or casing, it is important that the repair tire have a limited degree of fullness on its two opposite sides, about midway between the longitudinal center of the tread and the beads of the clencher tire, for instance.

Before applying the repair tire to the worn casing, the inner tube is removed and rubber cement is applied to the exterior surface of the casing and to the interior surface of the repair tire. It is very important that the aforesaid degree of fullness on opposite sides of the repair tire be maintained in order that the rigid condition of the tire after inflation shall be confined exclusively to the original casing, in order that the repair tire shall fully perform its proper function of renewing the life of the original tire. If the repair tire were tightly cemented to the original casing, as naturally would be done by a novice in applying it, after applying the cement, as heretofore stated, the slight degree of expansion of the casing on opposite sides would be transmitted to the repair tire and the latter would be given the same degree of rigidity which is given to the casing. But, as it is important to confine this rigidity to the original casing alone, after applying the cement and placing the repair tire over the original casing, I insert a so-called fuller tool between the repair tire and the casing and move this tool (which has a slim, rod-shaped, blade and a handle applied to a shank portion, forming approximately right angles with the blade) so that its blade member shall extend in a direction lengthwise of the tire, the said blade being moved around the tire between the half-sole and the casing on opposite sides, and during this operation one hand of the operator is so placed upon the repair tire that the thumb engages the latter between the tool blade and the bead of the clencher casing, the blade of the tool forming a fullness above the end of the thumb in the direction of the tread of the tire, this fullness being held or preserved from the fact that the end of the thumb presses the engaged portion of the repair tire into close engagement with the corresponding portion of the casing and closely cements the repair tire to the casing. After this is done, a so-called stitching tool is used to force the adjacent portion of the repair tire into the groove of the clencher casing, assuming that the casing is adapted for use with the clencher rim. This stitching tool is used without disturbing the cemented condition between the repair tire and the casing between the said groove and the fulled portion of the repair tire.

Having thus outlined my process, I will proceed to describe the same more in detail, reference being made to the accompanying drawing, which illustrates the various steps of the process and the articles or tools used in practising the same. In this drawing:

Figure 1 is a sectional end elevation of a so-called repair or half-sole tire.

Fig. 2 is a similar view of the casing of an original tire after the same has become so worn as to require a repair tire.

Fig. 3 is a cross section showing the repair tire and casing combined or assembled.

Fig. 4 is a detail view of the fuller tool employed in carrying out the process.

Fig. 5 is a perspective view, illustrating the use of the fuller tool in practising the process.

Fig. 6 is a cross section illustrating the casing and repair tire, shown in the assembled casing and repair tire, shown in the assembled relation after the fuller tool has been used and preparatory to the performance of the so-called stitching function, an inner expanding tool employed during the stitching process being shown in place.

Fig. 7 is a similar view after the stitching process has been completed.

Fig. 8 is a perspective view of the casing-expanding tool.

Fig. 9 is a similar view of the tool which is employed to press the adjacent portions of the repair tire into the clencher groove of the casing.

Fig. 10 is a similar view of a tool for pressing the fulled portions of the repair tire into place, after the tool illustrated in Fig. 9 has been employed.

Fig. 11 shows a tire with the tools illustrated in Figs. 4 and 8 in place.

The same reference characters indicate the same parts in all the views.

Let the numeral 5 designate the repair tire and 6 the casing of the original tire, so worn as to require the repair tire. In Fig. 2 the dotted lines indicate parts 7 of the original casing, which should be buffed off before applying the repair tire. After this has been done, the repair tire is applied to the casing, as shown in Fig. 3. Before doing this, however, a so-called chafing strip, designated by the numeral 8 in Fig. 2, is removed in order to make room for the corresponding part of the repair tire. In the last named view this chafing strip has been removed on the upper side, but is still in place on the lower side, as indicated by the said numeral. This chafing strip is only employed on clencher rim casings. Before applying the tire 5 to the casing 6, the rubber cement is applied to the inner surface of the repair tire and to the outer surface of the original casing. The fuller tool 9 is then brought into requisition, said tool being composed of a rod-shaped, slightly tapering blade, 10, a shank, 12, extending approximately at right angles to the blade, and which is provided with a handle, 13. The blade is inserted between the casing 6 and the repair tire 5, as illustrated in Fig. 5, the blade, 10, of the tool occupying a position approximately half way between the center circumference of the casing and the clencher, or other, bead of the latter. In this event the handle 13 of the fuller tool protrudes and is grasped by one hand of the operator while his other hand takes the position illustrated in the last named figure, and so that the thumb engages the repair tire exteriorly between the blade 10 of the tool and the groove 14, or bead, of the casing. As the tool is moved around the tire on one side, the hand which engages the repair tire is correspondingly moved, so that the thumb presses the engaging portion of the repair tire into close contact with the corresponding surface of the original casing, thus cementing the repair tire and casing together and leaving the fullness, 15, where the blade, 10, of the fuller tool has traveled. After the tool 9 has been used on one side of the tire and before removing it, the so-called stitching tool, 17 (see Fig. 9), is employed. This tool consists of a rotary disk, 18, and a handle, 19. In using the tool 17, the disk is applied to the repair tire and forces the adjacent portion of the latter into the groove 14 on the fulled side of the tire, thus causing the corresponding portion of the repair tire to closely engage the casing in the groove, except where the tool 9 is located. This is done, however, without disturbing the adhering condition of the repair tire where the latter was pressed into position by the use of the thumb during the use of the fuller tool.

After using the tool 17, as just explained, the tool 23 (shown in Fig. 10) is employed. This tool 23 consists of a roller, 20, pivotally mounted in the bifurcated part, 21, of a handle, 22. This roller is applied to the fulled portion, 15, of the repair tire and moved around the same, the movement of the roller commencing at one side of the location of the fuller tool, which is still in place, and continued until the tool 9 is reached in the circular path defined by the fulled portion of the tire, after which the tool 9 is removed and the roller passed over the fulled portion of the tire occupied by the tool 9 before its removal. This use of the tool 23 expels the air from the space 16 through the fuller tool opening, and presses the fulled portion 15 of the repaired tire into place but leaves this portion in such condition that when the tire is inflated it will respond to the slight expansion of the casing without placing the repair tire under stress. The stitching tool is then used to finish the operation of forcing the adjacent portion of the tire into the groove 14 at the place where the tool 9 was located when the stitching tool was first used. After this is done the same operation is performed on the opposite side of the tire by employing the tools 9, 17 and 23.

During the use of the tools 17 and 23, an expansion tool, 24 (see Fig. 8) may be employed, its portion 25 being used to fill the space within the original casing while the handpiece, 26, forms a hold for the hand of the operator. One hand is used to move the tool 24, while the other hand is used to manipulate the tool 23.

It must be understood that this process is equally applicable in applying repair tires to casings other than those employed with clencher rims, the only difference being that the adjacent portions of the repair tire are properly pressed into place at and around the beads of the casing by the use of any suitable tool or other device. In the drawing, the illustration is directed to the carrying out of the process in connection with a casing adapted for use within a clencher rim but, as just explained, it is evident that the process is not limited to this use but is equally applicable to the placing of repair tires on casings of other construction.

It should also be explained that the use of the process is not limited to the employment of the specific construction of tools illustrated in the drawing, whose only object is to disclose devices which may be employed with good results in carrying out or practising the process.

Having thus described my invention, what I claim is:

1. The herein-described process for attaching repair tires to worn casings, consisting in applying a suitable cement to the outer surface of the casing and to the inner surface of the repair tire, fulling the latter on opposite sides and simultaneously pressing the tire into contact with the casing between the fulling and the rim portion of the casing.

2. A process for attaching repair tires to worn casings, consisting in applying a suitable cement to the outer surface of the casing and to the inner surface of the repair tire, fulling the latter and pressing the tire into contact with the casing between the fulling and the rim portion of the casing.

3. A process of assembling an inner tire or carcass member and an outer tire or wearing member, comprising coating the adjacent surfaces of the two members with an adhesive, placing them in the assembled relation and fulling the outer member to relieve it from the stress imparted to the inner member due to inflation.

4. A process of attaching repair tires to worn casings, comprising applying a suitable cement to the adjacent surfaces of the two members, placing them in the assembled relation, passing a fuller tool between the two members and moving it entirely around on opposite sides, pressing the repair tire into contact with the casing adjacent the path of the tool, supporting the casing from the inside, pressing the adjacent portions of the tire member into engagement with the rim portions of the casing, and finally pressing the fulled portions of the tire into contact with the casing.

5. A process of attaching repair tires to worn casings, comprising applying a suitable cement to the adjacent surfaces of the two members, placing the latter in the assembled relation, passing a fuller tool between the two members and moving it entirely around on opposite sides, pressing the repair tire into contact with the casing adjacent the path of the said tool, pressing the adjacent portions of the tire member into engagement with the rim portions of the casing, and finally pressing the fulled portions of the tire into contact with the casing.

In testimony whereof I affix my signature.

CHAS. C. GATES.